United States Patent [19]
Welschof et al.

[11] 3,879,960
[45] Apr. 29, 1975

[54] CONSTANT VELOCITY JOINT

[75] Inventors: Hans-Heinrich Welschof, Obertshausen; Erich Aucktor, Offenbach am Main, both of Germany

[73] Assignee: Lohr & Bromkamp GmbH, Offenbach am Main, Germany

[22] Filed: Oct. 25, 1973

[21] Appl. No.: 409,681

[30] Foreign Application Priority Data
Oct. 27, 1972   Germany............................ 2252827

[52] U.S. Cl. .................................................. 64/21
[51] Int. Cl. ................................................. F16d 3/30
[58] Field of Search ............................ 64/21, 8, 9 A

[56] References Cited
UNITED STATES PATENTS

| | | |
|---|---|---|
| 2,046,584 | 3/1936 | Rzeppa ................................ 64/21 |
| 2,150,952 | 3/1939 | Ward ................................... 64/21 |
| 2,579,356 | 12/1951 | Anderson ............................. 64/21 |
| 2,949,022 | 8/1960 | Leon .................................... 64/21 |
| 3,447,341 | 6/1969 | Miller, Jr. ............................. 64/21 |
| 3,475,924 | 11/1969 | Aucktor ................................ 64/21 |

Primary Examiner—Benjamin W. Wyche
Assistant Examiner—Randall Heald
Attorney, Agent, or Firm—Karl W. Flocks

[57] ABSTRACT

A constant velocity joint with torque transmission by means of balls cooperating with grooves in meridian planes in inner and outer joint members with the balls guided in windows of a cage having spherical inside and outside surfaces. The groove surfaces are not undercut in the longitudinal direction and are made up of at least two axially adjoining lines, either curved or straight, when viewed in longitudinal section.

7 Claims, 5 Drawing Figures

CONSTANT VELOCITY JOINT

BACKGROUND OF THE INVENTION

This invention relates to a constant-velocity joint with torque transmission by means of balls which cooperate with grooves arranged in pairs in meridian planes in an inner joint member and an outer joint member, said balls being guided in windows of a cage which has a spherical surface on the inside and on the outside, said spherical surface cooperating with a complementary spherical surface on the inner and outer joint members.

Constant velocity joints of this kind are used particularly for applications in which a high degree of bending angle mobility is required.

In a known constant velocity joint of this kind (FIG. 5 of U.S. Pat. No. 2,046,584 of A. H. Rzeppa entitled "Universal Joint") the groove contours considered in the longitudinal direction of the grooves each follow a straight line so inclined to the direction of the axis of the joint that the two straight lines of each pair of grooves diverge to one side, so that the grooves are not undercut. By not undercut is meant that the grooves are of a configuration that they can be cut by a forming tool which moves in and cuts from one side only of the joint member. In the case of large bending angles, these known constant velocity joints do not have an adequate groove depth so that when a specific torque is to be transmitted the pressure between the balls and the groove walls may be excessive.

In another known constant velocity joint of the above type (FIG. 3 of U.S. Pat. No. 2,046,584), the grooves have an arcuate configuration in the longitudinal direction and the two grooves of each pair have centres of curvature offset by the same amounts to opposite sides of the joint centre plane, said centres of curvature being situated on the joint axis. The arcuate grooves are thus undercut in their longitudinal direction in this known constant velocity joint.

SUMMARY OF THE INVENTION

In a constant velocity joint having grooves which are not undercut in the longitudinal direction, according to a first embodiment of the invention the base of the grooves as considered in longitudinal section is made up of at least two axially adjoining lines or curves of different configureations.

In a constant velocity joint of the above kind in which the grooves have an arcuate configuration in the longitudinal direction and have centres of curvature offset by the same amounts in pairs to opposite sides of the joint plane, according to a second embodiment of the invention the centres of curvature of the grooves when the joint is in the extended position may be situated on a parallel to the joint axis and the distances of the centres of curvature from the joint centre axis are at least equal to the distance of the end face of the outer joint member from the joint centre plane.

It is an object of the present invention that in the construction of the grooves in the constant velocity joint according to the invention it is ensured that there is an adequate depth of groove even with a large bending angles.

It is a further object of the present invention to have grooves of the constant velocity joint produced economically by non-cutting production processes such as sinterin: or cold extrusion. This was impossible in the hitherto conventional constant velocity joints in which the grooves are undercut in the longitudinal direction thereof.

BRIEF DESCRIPTION OF THE DRAWINGS

The invention will be explained in detail hereinafter with reference to diagrammatic drawings of a number of exemplified embodiments wherein.

DESCRIPTION OF THE PREFERRED EMBODIMENTS

Figure 1:
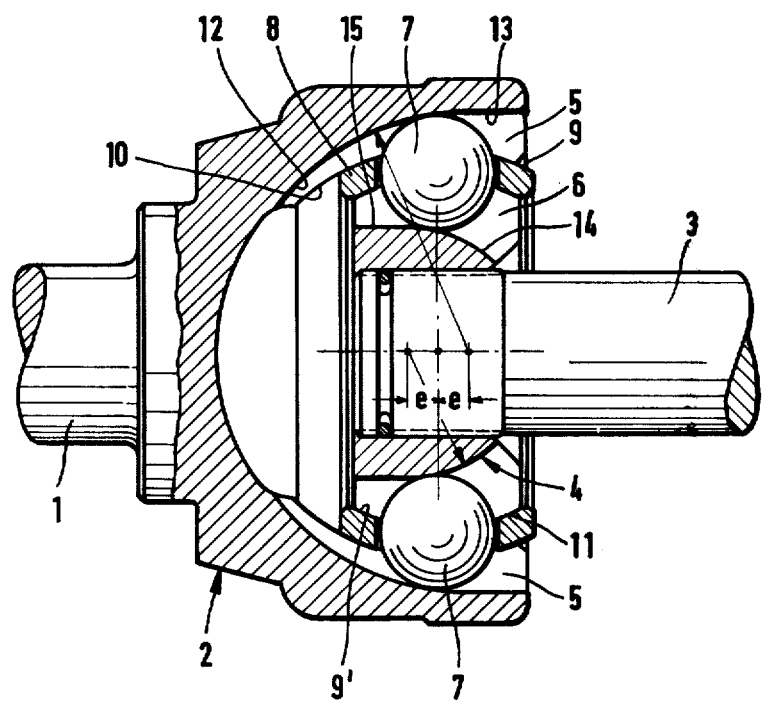
FIG. 1 is an axial section of a constant velocity joint according to a first embodiment of the invention.

The constant velocity joint shown in FIG. 1 comprises an outer joint member 2 integral with a shaft 1, and an inner joint member 4 secured to a shaft 3. Grooves 5 and 6 are associated with one another in pairs in meridian planes in the two joint members 2 and 4. A ball 7 serving for torque transmission between the two joint members 2 and 4 runs in each pair of grooves 5,6. The balls 7 are guided in a cage 8 which is guided by an outer spherical surface 9 in a hollow spherical surface 10 of the outer joint member 2 and by a hollow spherical surface 9' on an outer spherical surface 11 of the inner joint member 4. The centre point of these spherical surfaces coincides with the centre of the joint.

Figure 2:
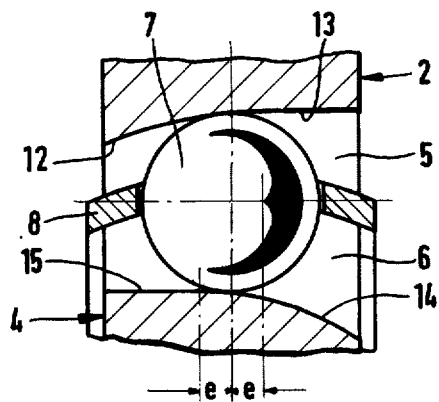
FIG. 2 shows the groove configuration of the joint according to FIG. 1 to an enlarged scale.

Referring to FIG. 2, the base of each groove 5 is made up of an arcuate portion 12 followed by an axis-parallel straight line 13. Similarly, the base of each groove 6 is made up of an arcuate portion 14 followed by an axis-parallel straight line 15. The cavity formed by each pair of associated grooves 5 and 6 widens out to one axial side. The centre points of the arcuate portions 12 and 14 are offset from one another by the amount $2e$ on the axes of the associated joint members 2 and 4 when the joint is in the extended condition. The consequence of this arrangement is that when the joint is bent the balls 7 are always situated in the bisecting plane of the joint; i.e., in the plane bisecting the angle between the axes of the two joint members 2 and 4. Reference $e$ denotes the axial distance of each of the two centres of curvature of the arcuate portions 12 and 14 from the joint centre; this distance must be equal on both sides, to ensure the described position of the balls when the joint bends.

Figure 3:
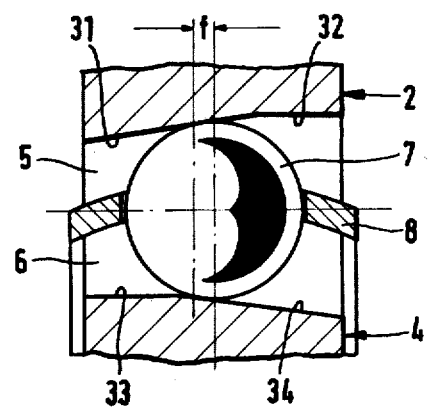
FIGS. 3 and 4 show modified groove configurations in the joint according to FIG. 1.
Figure 4:
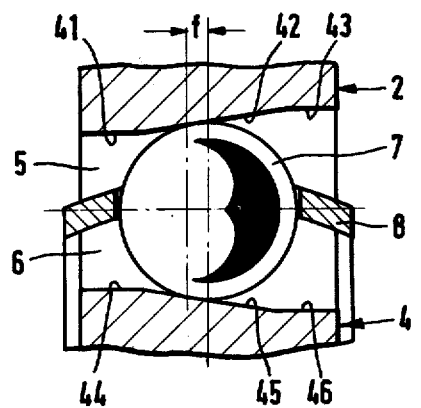

In the embodiments shown in FIGS. 3 and 4, like, parts have the same references as in FIGS. 1 and 2.

In the embodiment shown in FIG. 3, the base of the grooves 5 in the outer joint member 2 and of the grooves 6 in the inner joint member 4 is formed by two adjoining straight lines 31, 32 and 33, 34. The straight lines 31 and 34 have identical but opposite inclinations to the axis of the extended joint. The inclined straight lines 31 and 34 are followed by axis-parallel straight lines 32, 33 respectively in the two joint members 2 and 4, starting in the same radial plane. The points of contact of the two inclined straight lines 31, 34 and each ball 7 are offset by the distance $f$ from the centre of the joint; consequently, in this embodiment too, the balls 7 are situated in the bisecting plane of the joint for any bend angle.

In the embodiment shown in FIG. 4, the contours of the base of the grooves 5 and 6 in the outer joint member 2 and in the inner joint member 4 are each formed by three adjoining straight lines 41, 42, 43 and 44, 45, 46 respectively. Between each pair of axis-parallel straight lines 41, 43 and 44, 46 respectively, there is disposed a straight line 42, 45 respectively inclined to the joint axis. The two inclined straight lines 42 and 45 are inclined in opposite directions as in the embodiment according to FIG. 3, and their point of contact with the ball 7 is axially offset by the amount $f$ from the centre of the joint.

Figure 5:
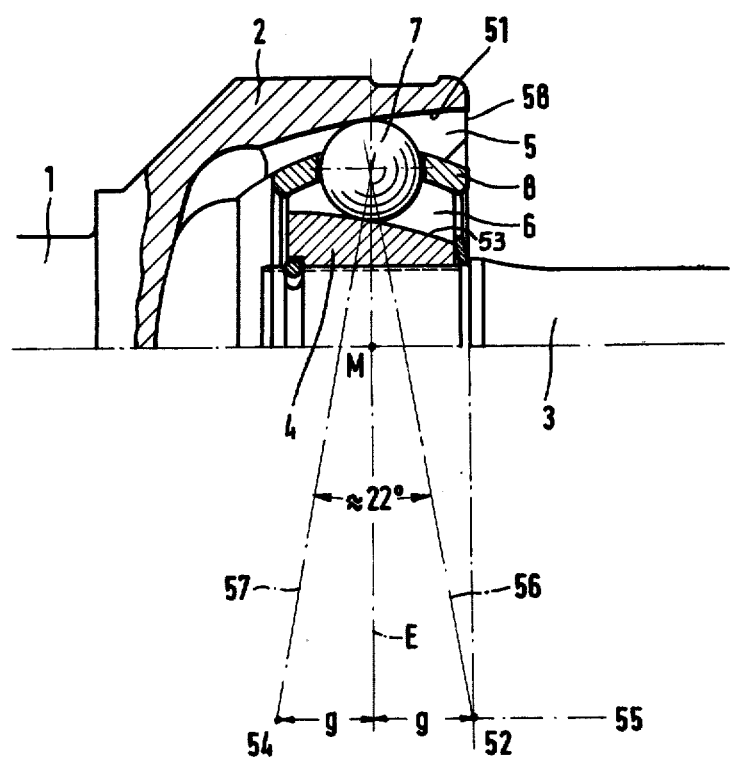
FIG. 5 is an axial section through a constant velocity joint according to a second embodiment of the invention.

In the constant velocity joint shown in FIG. 5, the joint members 2 and 4 are centred in relation to one another by a cage 8 which is in the form of a spherical shell and which can pivot with respect to the two joint members 2 and 4 about their common centre M. Torque transmission between the joint members 2 and 4 is rendered possible by six balls 7 which are guided in the cage 8 and in the grooves 5 and 6 of the joint members. When the joint is bent, uniform transmission of the rotary movement between the shafts 1 and 3 is not ensured until the balls 7 are controlled into a plane which bisects the angle between the axes of the shafts 1 and 3. To achieve this control effect, the grooves 5 of the outer joint member 2 have an arcuate base 51 with a centre of curvature 52, when viewed in axial section, and the grooves 6 of the inner joint member 4 have a likewise arcuate base 53 having the centre of curvature 54 which viewed in axial section. Both centres of curvatures 52 and 54 are situated on a parallel 55 to the axis of the shaft 3 when the joint is in the extended position.

The distances $g$ of the centres of curvature 52 and 54 from the joint centre plane E are equal and such that the normals 56 and 57 at the points of contact between the balls 7 and the grooves 5 and 6 form an angle of about 22° and the distances $g$ are equal to or greater than the distance of the end face 58 of the outer joint member 2 from the joint centre plane E.

The grooves 5 and 6 of all the joint illustrated have no undercut portions in the longitudinal direction so that they can be produced from one end of the appropriate joint member, for example by axial cold extrusion or sintering.

The constant velocity joint according to the embodiments of the invention can be produced either by non-cutting processes or by metal removal. It is particularly advantageous to produce the grooves in the inner joint member by sintering or cold extrusion and the grooves in the outer joint member by cutting, the grooves in the outer joint member being adapted to those in the inner joint member.

It will be obvious to those skilled in the art that various changes may be made without departing from the scope of the invention and the invention is not to be considered limited to what is shown in the drawings and described in the specification.

What is claimed is:

1. A constant velocity joint for torque transmission comprising
    an inner joint member and an outer joint member having grooves therein arranged in pairs in meridian planes and with said grooves having surfaces extending without undercutting in the longitudinal direction and forming a jaw-shaped opening in the longitudinal direction, surfaces on said inner and outer joint members, and having windows in said cage for guiding said balls.
2. The constant velocity joint according to claim 1, further characterized by said adjoining lines being lines of the same order.
3. The constant velocity joint according to claim 2, further characterized by said adjoining lines being to straight lines having different inclinations to the longitudinal axis of the joint.
4. The constant velocity joint according to claim 3, further characterized by one of said two straight lines extending in parallel relationship to the longitudinal axis of the joint.
5. The constant velocity joint according to claim 2, further characterized by said adjoining lines being three straight lines.
6. The constant velocity joint according to claim 1, further characterized by said adjoining lines being an arcuate portion and a straight line.
7. A constant velocity for torque transmission comprising
    an inner joint member and an outer joint member having grooves therein arranged in pairs in meridian planes and with said grooves extending in the form of arcs of a circle in the longitudinal direction and having centres of curvature offset in pairs by equal distances to opposite sides of the joint centre with the centres of curvature situated on a parallel to the axis of the joint and the distances of the centres of curvature from a centre plane transversely through the joint being at least equal to the distance of the end face of said outer joint member from the joint centre plane
    balls cooperating with said grooves,
    and a cage having spherical outside and inside surfaces cooperating with complementary groove surfaces on said inner and outer joint members, and having windows in said cage for guiding said balls.

* * * * *